(12) United States Patent
Dershem

(10) Patent No.: US 8,530,573 B2
(45) Date of Patent: *Sep. 10, 2013

(54) MODIFIED CALCIUM CARBONATE-FILLED ADHESIVE COMPOSITIONS AND METHODS FOR USE THEREOF

(75) Inventor: Stephen Dershem, San Diego, CA (US)

(73) Assignee: Designer Molecules, Inc., San Diego, CA (US)

(*) Notice: Subject to any disclaimer, the term of this patent is extended or adjusted under 35 U.S.C. 154(b) by 781 days.

This patent is subject to a terminal disclaimer.

(21) Appl. No.: 11/801,412

(22) Filed: May 9, 2007

(65) Prior Publication Data

US 2008/0075963 A1  Mar. 27, 2008

Related U.S. Application Data

(60) Provisional application No. 60/799,078, filed on May 10, 2006.

(51) Int. Cl.
*C09J 135/04* (2006.01)

(52) U.S. Cl.
USPC ........... 524/788; 524/425; 524/426; 524/427; 156/327; 156/331.1

(58) Field of Classification Search
USPC .................. 524/425, 788, 426, 427; 423/430
See application file for complete search history.

(56) References Cited

U.S. PATENT DOCUMENTS

| | | | |
|---|---|---|---|
| 3,901,845 A * | 8/1975 | Newbould | 523/216 |
| 4,111,879 A | 9/1978 | Mori et al. | |
| 4,774,267 A * | 9/1988 | Weintraub | 523/116 |
| 4,968,738 A | 11/1990 | Dershem | |
| 5,045,127 A | 9/1991 | Dershem et al. | |
| 5,064,480 A | 11/1991 | Dershem et al. | |
| 5,232,962 A | 8/1993 | Dershem et al. | |
| 5,306,333 A | 4/1994 | Dershem et al. | |
| 5,358,992 A | 10/1994 | Dershem et al. | |
| 5,403,389 A | 4/1995 | Dershem | |
| 5,447,988 A | 9/1995 | Dershem et al. | |
| 5,489,641 A | 2/1996 | Dersehm | |
| 5,602,205 A | 2/1997 | Singh et al. | |
| 5,646,241 A | 7/1997 | Dershem et al. | |
| 5,714,086 A | 2/1998 | Osuna et al. | |
| 5,717,034 A | 2/1998 | Dershem et al. | |
| 5,718,941 A | 2/1998 | Dershem et al. | |
| 5,753,748 A | 5/1998 | Dershem et al. | |
| 5,861,111 A | 1/1999 | Dershem et al. | |
| 5,969,036 A | 10/1999 | Dershem | |
| 5,973,166 A | 10/1999 | Mizori et al. | |
| 6,034,150 A | 3/2000 | Hoyle et al. | |
| 6,034,194 A | 3/2000 | Dershem | |
| 6,034,195 A | 3/2000 | Dershem | |
| 6,121,358 A | 9/2000 | Dershem et al. | |
| 6,187,886 B1 | 2/2001 | Husson et al. | |
| 6,211,320 B1 | 4/2001 | Dershem et al. | |
| 6,300,456 B1 | 10/2001 | Musa | |
| 6,369,124 B1 | 4/2002 | Hoyle et al. | |
| 6,369,183 B1 * | 4/2002 | Cook et al. | 528/10 |
| 6,423,780 B1 | 7/2002 | Dershem et al. | |
| 6,429,281 B1 | 8/2002 | Dershem et al. | |
| 6,521,731 B2 | 2/2003 | Dershem et al. | |
| 6,620,946 B2 | 9/2003 | Dersehm et al. | |
| 6,743,852 B2 | 6/2004 | Dershem et al. | |
| 6,750,301 B1 | 6/2004 | Bonneau et al. | |
| 6,790,597 B2 | 9/2004 | Dershem | |
| 6,825,245 B2 | 11/2004 | Dershem | |
| 6,831,132 B2 | 12/2004 | Liu et al. | |
| 6,852,814 B2 | 2/2005 | Dershem et al. | |
| 6,855,745 B2 | 2/2005 | Hoyle et al. | |
| 6,916,856 B2 | 7/2005 | Dershem | |
| 6,946,523 B2 | 9/2005 | Dershem et al. | |
| 6,960,636 B2 | 11/2005 | Dershem et al. | |
| 6,963,001 B2 | 11/2005 | Dershem et al. | |
| 7,102,015 B2 | 9/2006 | Dershem et al. | |
| 7,157,587 B2 | 1/2007 | Mizori et al. | |
| 7,176,044 B2 | 2/2007 | Forray et al. | |
| 7,199,249 B2 | 4/2007 | Liu et al. | |
| 7,208,566 B2 | 4/2007 | Mizori et al. | |
| 7,309,724 B2 | 12/2007 | Dershem et al. | |
| 7,517,925 B2 | 4/2009 | Dershem et al. | |
| 7,678,879 B2 | 3/2010 | Dershem | |
| 7,863,346 B2 * | 1/2011 | Dershem et al. | 522/104 |
| 2002/0046806 A1 * | 4/2002 | Yamada et al. | 156/330 |
| 2002/0062923 A1 | 5/2002 | Forray | |
| 2002/0099168 A1 | 7/2002 | Dershem et al. | |
| 2002/0188137 A1 | 12/2002 | Dershem et al. | |
| 2002/0193541 A1 | 12/2002 | Dershem et al. | |
| 2002/0198356 A1 | 12/2002 | Dershem et al. | |
| 2003/0008992 A1 | 1/2003 | Dershem et al. | |
| 2003/0055121 A1 | 3/2003 | Dershem et al. | |
| 2003/0060531 A1 | 3/2003 | Dershem et al. | |
| 2003/0087999 A1 | 5/2003 | Dershem et al. | |
| 2003/0109666 A1 | 6/2003 | Dershem et al. | |

(Continued)

FOREIGN PATENT DOCUMENTS

| EP | 0393713 | 6/1994 |
|---|---|---|
| EP | 1156036 | 11/2001 |

(Continued)

OTHER PUBLICATIONS

Meyer, Raymond W. Handbook of Molding Compounds and Molding Technology. 1987. Kluwer, p. 83.*

(Continued)

*Primary Examiner* — Liam Heincer
*Assistant Examiner* — Michael A Salvitti
(74) *Attorney, Agent, or Firm* — The Law Office of Jane K. Babin, Professional Corporation; Jane K. Babin

(57) ABSTRACT

The invention is based on the discovery that modified calcium carbonates can be used as fillers for the preparation of non-abrasive adhesive formulations that are useful in microelectronic applications. The modified calcium carbonate fillers possess functional groups, which form strong bonds to the thermoset matrix. Invention compositions display excellent rheological properties, in addition to a low coefficient of thermal expansion.

14 Claims, No Drawings

(56) References Cited

U.S. PATENT DOCUMENTS

| | | |
|---|---|---|
| 2003/0125551 A1 | 7/2003 | Dershem et al. |
| 2003/0199638 A1 | 10/2003 | Liu et al. |
| 2003/0208016 A1 | 11/2003 | Dershem et al. |
| 2004/0006166 A1 | 1/2004 | Liu et al. |
| 2004/0019224 A1 | 1/2004 | Dershem et al. |
| 2004/0023926 A1* | 2/2004 | Guennouni et al. ............ 514/63 |
| 2004/0076574 A1* | 4/2004 | Xu et al. ........................ 423/430 |
| 2004/0077798 A1 | 4/2004 | Dershem et al. |
| 2004/0082724 A1 | 4/2004 | Dershem et al. |
| 2004/0102566 A1 | 5/2004 | Forray et al. |
| 2004/0123948 A1 | 7/2004 | Dershem et al. |
| 2004/0225026 A1 | 11/2004 | Mizori et al. |
| 2004/0225045 A1 | 11/2004 | Forray |
| 2004/0225059 A1 | 11/2004 | Mizori et al. |
| 2005/0004266 A1* | 1/2005 | Kayano et al. ................ 523/210 |
| 2005/0107542 A1 | 5/2005 | Liu et al. |
| 2005/0136620 A1 | 6/2005 | Dershem et al. |
| 2005/0137277 A1 | 6/2005 | Dershem et al. |
| 2005/0267254 A1 | 12/2005 | Mizori et al. |
| 2005/0272888 A1 | 12/2005 | Dershem et al. |
| 2006/0009578 A1 | 1/2006 | Dershem |
| 2006/0063014 A1* | 3/2006 | Forray .......................... 428/448 |
| 2006/0069232 A1 | 3/2006 | Dershem |
| 2006/0116476 A1 | 6/2006 | Cheng |
| 2006/0142517 A1 | 6/2006 | Dershem |
| 2006/0148930 A1* | 7/2006 | Blanchard et al. ............ 523/200 |
| 2006/0183846 A1* | 8/2006 | Pfenninger et al. ........... 524/588 |
| 2007/0155869 A1 | 7/2007 | Dershem et al. |
| 2007/0205399 A1 | 9/2007 | Mizori |
| 2007/0299154 A1* | 12/2007 | Dershem et al. .............. 522/104 |
| 2008/0017308 A1 | 1/2008 | Dershem et al. |
| 2008/0075961 A1 | 3/2008 | Mizori |
| 2008/0075963 A1 | 3/2008 | Dershem |
| 2008/0075965 A1 | 3/2008 | Dershem |
| 2008/0103240 A1 | 5/2008 | Dershem |
| 2008/0142158 A1 | 6/2008 | Dershem |
| 2008/0146738 A1 | 6/2008 | Dershem |
| 2008/0160315 A1 | 7/2008 | Forray et al. |
| 2008/0191173 A1 | 8/2008 | Dershem et al. |
| 2008/0210375 A1 | 9/2008 | Dershem et al. |
| 2008/0251935 A1 | 10/2008 | Dershem |
| 2008/0257493 A1 | 10/2008 | Dershem |
| 2008/0262191 A1 | 10/2008 | Mizori |
| 2009/0061244 A1 | 3/2009 | Dershem |
| 2009/0215940 A1 | 8/2009 | Dershem |
| 2009/0288768 A1 | 11/2009 | Dershem |
| 2010/0041803 A1 | 2/2010 | Dershem |
| 2010/0041823 A1 | 2/2010 | Dershem |
| 2010/0041832 A1 | 2/2010 | Dershem |
| 2010/0041845 A1 | 2/2010 | Dershem et al. |
| 2010/0056671 A1 | 3/2010 | Dershem |
| 2010/0063184 A1 | 3/2010 | Dershem |

FOREIGN PATENT DOCUMENTS

| | | |
|---|---|---|
| WO | WO/03080720 * | 10/2003 |
| WO | WO 2004099331 | 11/2004 |
| WO | WO-2005121190 | 12/2005 |
| WO | WO-2007100329 | 9/2007 |
| WO | WO-2008077141 | 6/2008 |
| WO | WO-2008124797 | 10/2008 |
| WO | WO-2008130894 | 10/2008 |
| WO | WO-2010019832 | 2/2010 |

OTHER PUBLICATIONS

Adamson, "Review of CSP and Flip Chip Underfill Processes and When to Use the Right Dispensing Tools for Efficient Manufacturing", *Paper Presented at GlobalTRONICS Technology Conference*,Singapore 2002, 1-6.

Andersson et al., "Initiator-Free Photopolymerization of an Aliphatic Vinyl Ether-Maleimide Monomer", *J Coatings Tech 69*: 1997, 91-95.

Grenier-Loustalot et al., "Monofunctional maleimide or acetylene tennlnated model compounds-I. Molten state homopolymerization reactivity and kinetics", *European Polymer Journal 34*: 1998, 1705-1714.

Kohli et al., "Co-Polymerization of Maleimides and Vinyl Ethers: A Structural Study", *Macromolecules 31*: 1998, 5681-5689.

Yamazaki et al., "Effect of N-substrtuents on polymerization reactivity of N-alkylitaconimides in radical polymerization", *European Polymer Journal 33*: 1997, 157-162.

* cited by examiner

MODIFIED CALCIUM CARBONATE-FILLED ADHESIVE COMPOSITIONS AND METHODS FOR USE THEREOF

RELATED APPLICATION DATA

This application claims the benefit of priority of U.S. Provisional Application Ser. No. 60/799,078 filed May 10, 2006, the entire disclosure of which is incorporated herein by reference.

FIELD OF THE INVENTION

The present invention relates to thermosetting adhesive compositions, methods of preparation and uses therefor. In particular, the present invention relates to thermosetting compositions containing modified calcium carbonate.

BACKGROUND OF THE INVENTION

As the electronics industry advances, and production of light weight components increases, the development of new materials gives producers increased options for further improving the performance and ease of manufacture of such components. Adhesive compositions are used for a variety of purposes in the fabrication and assembly of semiconductor packages and microelectronic devices. The more prominent uses include bonding of electronic elements such as integrated circuit chips to lead frames or other substrates, and bonding of circuit packages or assemblies to printed wire boards.

Adhesives used in the electronic packaging industry typically contain a thermosetting resin, combined with a filler and some type of curing initiator. These resins are primarily used in the electronics industry for the preparation of non-hermetic electronic packages. Adhesives useful for electronic packaging applications typically exhibit properties such as good mechanical strength, curing properties that do not affect the component or the carrier, and Theological properties compatible with application to microelectronic and semiconductor components. Examples of such packages are ball grid array (BGA) assemblies, super ball grid arrays, IC memory cards, chip carriers, hybrid circuits, chip-on-board, multi-chip modules, pin grid arrays, and the like.

In addition, there are many potential applications for adhesives having electrically insulating properties. Such materials must, however, satisfy a combination of criteria, i.e., in addition to exhibiting a low dielectric constant, such materials must also have good dispensability and good adhesion properties. Non-conductive fillers traditionally employed for the preparation of adhesives having electrically insulating properties include aluminum nitride, boron nitride, alumina, silicon dioxide, and the like.

The rheology of an adhesive paste is a very important consideration for manufacturing purposes. For example, separation of the filler from the resin in the syringe, a clean break of adhesive between each dispense thereof, and the presence of drip-free syringes in the dispense operation are all important attributes for consistent dispensing properties.

For all these applications, the microelectronics industry continues to require new adhesive formulations that are able to meet its varying demands. Accordingly, there is a need for the development of compositions and formulations to address the requirements of this rapidly evolving industry.

SUMMARY OF THE INVENTION

The invention is based on the discovery that surface modified calcium carbonate can be used as a filler for the preparation of adhesive formulations having low coefficients of thermal expansion. Invention compositions display excellent rheological properties. In addition, adhesive compositions containing calcium carbonate filler are particularly useful in stacked die applications. Calcium carbonate has a Mohs hardness of 3.0, and therefore does not damage die surfaces when the die and adhesive are assembled in a stacked arrangement. The inherent softness of calcium carbonate makes it much less abrasive than silica (another common non-conductive filler), which has a Mohs hardness of 7.0. Calcium carbonate has another practical advantage compared to silica fillers in that it can act as its own pigment. Adhesives containing only silica fillers do not reflect light well and this can be problematic for the optical recognition equipment used in automated die bonding equipment. Calcium carbonate fillers do not have this problem.

The surface modifications described in this invention can be used to improve the properties of the thermoset adhesives. The surface modifications described herein ensure a strong bond between the calcium carbonate filler and the thermoset resin. In some embodiments the modified calcium carbonate filler can also act as the sole cross-linking component in the adhesive. In addition, the surface modifications described in this invention can be used to improve the properties of the thermoset adhesives.

Invention formulations, furthermore, possess low thermal coefficients of expansion (CTE). Calcium carbonate has a linear thermal coefficient of expansion of 9 ppm/° K. This is much lower than the lowest CTE for organic thermosets, which usually are between 50 and 85 ppm/° C. The addition of the calcium carbonate filler, therefore, can be used to lower the overall CTE of the adhesive composition. Invention formulations can be used for a variety of purposes, such as, for example, for the preparation of filled adhesive formulations with a reduced propensity to settle out, excellent dispensing characteristics due to the thixotropic nature thereof, and the like.

In one embodiment of the invention, there are provided adhesive compositions including a polymerizable monomer vehicle selected from maleimides, (meth)acrylates, vinyl ethers, propargyl ethers, vinyl esters, urethanes, polyesters, polyester-linked (meth)acrylates, fumarates, maleates, itaconates, styrenic compounds, allyl functional compounds, epoxies, oxetanes, oxazolines, benzoxazines, or a mixture of any two or more thereof, a modified calcium carbonate, and a curing catalyst.

In another embodiment, there are provided assemblies including a first article permanently adhered to a second article by a cured aliquot of a composition including a polymerizable monomer vehicle, a modified calcium carbonate, and a curing catalyst.

In another embodiment, there are provided assemblies including a microelectronic device permanently adhered to a substrate by a cured aliquot of a composition including a polymerizable monomer vehicle, a modified calcium carbonate, and a curing catalyst.

In still another embodiment, there are provided methods for adhesively attaching a first article to a second article. Such methods can be performed, for example, by (a) applying an adhesive composition to the first article, wherein the adhesive composition includes a polymerizable monomer vehicle, a modified calcium carbonate, and a curing catalyst, (b) bringing the first and second article into intimate contact to form an assembly wherein the first article and the second article are separated only by the adhesive composition applied in step (a), and thereafter, (c) subjecting the assembly to conditions suitable to cure the adhesive composition.

In another embodiment, there are provided methods for adhesively attaching a microelectronic device to a substrate. Such methods can be performed, for example, by (a) applying an adhesive composition to the substrate and/or the microelectronic device, wherein the adhesive composition comprises a polymerizable monomer vehicle, a modified calcium carbonate, and a curing catalyst, (b) bringing the substrate and the device into intimate contact to form an assembly wherein the substrate and the device are separated only by the composition applied in step (a), and thereafter, (c) subjecting the assembly to conditions suitable to cure the composition.

DETAILED DESCRIPTION OF THE INVENTION

It is to be understood that both the foregoing general description and the following detailed description are exemplary and explanatory only and are not restrictive of the invention claimed. As used herein, the use of the singular includes the plural unless specifically stated otherwise. As used herein, "or" means "and/or" unless stated otherwise. Furthermore, use of the term "including" as well as other forms, such as "includes," and "included," is not limiting.

The section headings used herein are for organizational purposes only and are not to be construed as limiting the subject matter described. Unless specific definitions are provided, the nomenclatures utilized in connection with, and the laboratory procedures and techniques of analytical chemistry, synthetic organic and inorganic chemistry described herein are those known in the art. Standard chemical symbols are used interchangeably with the full names represented by such symbols. Thus, for example, the terms "hydrogen" and "H" are understood to have identical meaning. Standard techniques may be used for chemical syntheses, chemical analyses, and formulation.

The invention is based on the discovery that modified calcium carbonates can be used as fillers for the preparation of adhesive formulations having excellent adhesive properties. Invention compositions display excellent Theological properties, in addition to low coefficients of thermal expansion.

As used herein, "aliphatic" refers to any alkyl, alkenyl, or cycloalkyl moiety.

As used herein, "alkyl" refers to straight or branched chain hydrocarbyl groups having from 1 up to about 500 carbon atoms. "Substituted alkyl" refers to alkyl moieties bearing substituents including alkyl, alkenyl, alkynyl, hydroxy, oxo, alkoxy, mercapto, cycloalkyl, substituted cycloalkyl, heterocyclic, substituted heterocyclic, aryl, substituted aryl, heteroaryl, substituted heteroaryl, aryloxy, substituted aryloxy, halogen, haloalkyl, cyano, nitro, nitrone, amino, amido, —C(O)H, —C(O)—, —C(O)O—, —S—, —S(O)$_2$, —OC(O)—O—, —NR—C(O), —NR—C(O)—NR, —OC(O)—NR, wherein R is H or lower alkyl, acyl, oxyacyl, carboxyl, carbamate, sulfonyl, sulfonamide, sulfuryl, and the like.

As used herein, "cycloalkyl" refers to cyclic ring-containing groups containing in the range of about 5 up to about 20 carbon atoms, and "substituted cycloalkyl" refers to cycloalkyl groups further bearing one or more substituents as set forth above. In some embodiments, the cycloalkyl refers to cyclic ring-containing groups containing in the range of about 5 up to about 15 carbon atoms As used herein, "aryl" refers to aromatic groups having in the range of 6 up to 14 carbon atoms and "substituted aryl" refers to aryl groups further bearing one or more substituents as set forth above.

In one embodiment of the invention, there are provided adhesive compositions including a polymerizable monomer vehicle selected from maleimides, (meth)acrylates, vinyl ethers, propargyl ethers, vinyl esters, urethanes, polyesters, polyester-linked (meth)acrylates, fumarates, maleates, itaconates, styrenic compounds or allyl functional compounds, epoxies, oxetanes, oxazolines, benzoxazines, or a mixture of any two or more thereof, a modified calcium carbonate, and a curing catalyst.

As readily recognized by those of skill in the art, a wide variety of additional components can optionally be incorporated into the above-described compositions, such as, for example, coupling agents, anti-oxidants, stabilizers, bleed control agents, additional fillers (other than the required modified calcium carbonate filler), inert diluents, reactive diluents, adhesion promoters, flexibilizers, dyes, pigments, and the like.

While the use of inert diluents is not excluded from the practice of the invention, it is generally preferred that compositions of the invention remain substantially free of solvent, so as to avoid the potentially detrimental effects thereof, e.g., creation of voids caused by solvent escape, the environmental impact of vaporized solvent, the redeposition of outgassed molecules in the surface of the article, and the like.

Monomer vehicles contemplated for use in accordance with the present invention include maleimides, (meth)acrylates, vinyl ethers, propargyl ethers, vinyl esters, urethanes, polyesters, polyester-linked (meth)acrylates, fumarates, maleates, itaconates, styrenic compounds, allyl functional compounds, epoxies, oxetanes, oxazolines, benzoxazines, and the like, or a mixture of any two or more thereof.

Exemplary maleimides contemplated for use in the practice of the invention include compounds having the structure:

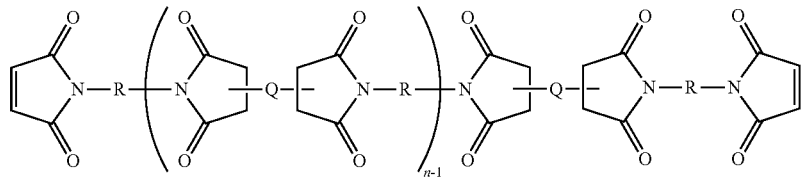

wherein:
R and Q are each independently substituted or unsubstituted aliphatic, aromatic, heteroaromatic, or siloxane moieties; and
n is 1 to about 10.

In some embodiments, R and Q are each independently substituted or un-substituted linear, branched, or cyclic aliphatic moieties having from 2 to about 500 carbon atoms. In other embodiments, R and Q are each independently substituted or un-substituted aromatic or heteroaromatic moieties having from 6 to about 14 carbon atoms. In still other embodiments, n is 1-6. In still further embodiments, n is 1-4. In one embodiment, n is 2.

Exemplary urethanes contemplated for use in the practice of the invention include compounds having the structure:

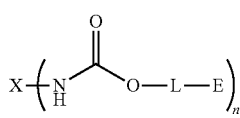

wherein:
X is a substituted or un-substituted aliphatic, aryl or heterocyclic;
each E is independently a polymerizable moiety selected from acrylate, methacrylate, olefin, epoxy, maleimide, vinyl ether, or vinyl ester;
each L is independently a bond or an alkylene or oxyalkylene linker; and
n is 1 to about 10.

In some embodiments, X is a substituted or un-substituted linear, branched, or cyclic aliphatic moiety having from 2 to about 500 carbon atoms. In other embodiments, X is a substituted or un-substituted aryl or heterocyclic moiety having from 6 to about 14 carbon atoms. In other embodiments, X is a substituted or un-substituted linear, branched, or cyclic aliphatic moiety having from 2 to about 50 carbon atoms. In still further embodiments, n is 1 to about 5. In further embodiments, n is 1 to about 3. In one embodiment, n is 2.

Exemplary polyester monomer vehicles contemplated for use in the practice of the invention include compounds having the structure:

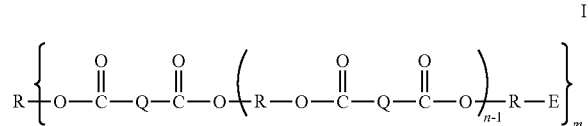

wherein:
R and Q are each independently substituted or unsubstituted aliphatic, aryl, or heteroaryl;
m is 3 or 4;
n is 1 to about 10; and
each E is independently acrylate, methacrylate, maleimide, styrenic, vinyl ester, olefin, allyl, vinyl ether, itaconate, fumarate, epoxy, oxetane, oxazoline, benzoxazine, cyanate ester, or propargyl ether.

In some embodiments, R is a substituted or un-substituted cycloalkyl having from 5 to about 20 carbon atoms. In other embodiments, R is a substituted or un-substituted cycloalkyl having from 5 to about 12 carbon atoms. In still other embodiments, R is a substituted or un-substituted cyclopentyl, cyclohexyl, norbornyl, tetracyclododecyl, or dicyclopentadienyl.

In some embodiments, Q is a substituted or un-substituted aryl or heteroaryl having from 6 to about 14 carbon atoms. In certain embodiments, Q is a substituted or un-substituted phenyl or naphthyl. In other embodiments, Q is a substituted or un-substituted cycloalkyl. In one embodiment, Q is a substituted or un-substituted norbornenyl.

A wide variety of modified calcium carbonate fillers are contemplated for use in the practice of the invention. In some embodiments, the modified calcium carbonate is modified with an acid. In some embodiments, the acid is a carboxylic acid. In other embodiments the acid is a functionalized carboxylic acid. Some examples of functionalized carboxylic acids useful in the practice of the invention include, but are not limited to, maleimidoundecanoic acid, maleimidohexanoic acid, 4-maleimidobenzoic acid, 3-maleimidobenzoic acid, 2-maleimidoacetic acid, 3-maleimidopropionic acid, 4-maleimidobutanoic acid, 4-hydroxybenzoic acid, acrylic acid, methacrylic acid, furoic acid, cinnamic acid, sorbic acid, undecenoic acid and the like. Also contemplated are acid esters such as fumaric acid esters, maleic acid esters, itaconic acid esters, and the like. Functional non-carboxylic acids are also contemplated in the practice of the invention (e.g. vinybenzene sulfonic acid, diallyl phosphate, and the like).

As readily recognized by those of skill in the art, a wide variety of curing catalysts can be employed in the preparation of invention compositions. The preferred catalyst to be used will, of course, depend on the monomer vehicle employed. For example, for those monomer vehicles which cure by a free radical mechanism, free radical initiators such as peroxy esters, peroxy carbonates, hydroperoxides, alkylperoxides, arylperoxides, and the like can be employed.

For those monomer vehicles, which cure by cationic and/or anionic polymerization, cationic catalysts, transition metal catalysts, and the like can be employed. Exemplary cationic catalysts contemplated for use herein include onium salts, iodonium salts, sulfonium salts, zinc salts, tin salts, and the like. Exemplary anionic catalysts include tertiary amines, imidazoles, imidazole salts, dicyanodicyanamide, and the like.

Exemplary transition metal catalysts contemplated for use herein include nickel, copper, cobalt and the like, in the form of a chelate, a soap, or the like.

The ratio of the various components of invention compositions can vary within wide ranges. For example, the quantity of monomer vehicle can vary anywhere within the range of about 25 to about 90 weight percent (wt %) of invention composition. In some embodiments, the quantity of monomer vehicle is in the range of about 40 up to about 80 wt % (based on the total weight of the final composition).

Similarly, the quantity of modified calcium carbonate employed in the practice of the invention can vary within wide ranges, typically falling in the range of about 10 up to about 75 wt % of invention composition. In some embodiments, the modified calcium carbonate is present in the composition in the range of about 20 up to about 60 wt % (based on the total weight of the final composition).

The quantity of curing catalyst employed in the practice of the invention can also vary widely, typically falling in the range of about 0.01 up to about 10 wt % of the composition (based on the total weight of the finished composition). As readily recognized by those of skill in the art, quantities at the lower end of this range are generally suitable when using transition metal catalysts, while quantities falling in the middle to the upper end of the range are generally suitable when free radical initiators are employed.

Invention compositions have excellent handling properties, typically existing as a thixotropic paste, which can readily be dispensed using standard equipment.

In another embodiment of the invention, there are provided methods for adhesively attaching a first article to a second article. Such methods can be performed, for example, by (a) applying an adhesive composition to the first article, wherein the adhesive composition includes a polymerizable monomer vehicle, a modified calcium carbonate, and a curing catalyst, (b) bringing the first and second article into intimate contact to form an assembly wherein the first article and the second article are separated only by the adhesive composition applied in step (a), and thereafter, (c) subjecting the assembly to conditions suitable to cure the adhesive composition.

Curing conditions contemplated for carrying out the above-described method typically comprise a temperature in the range of about 60° C. up to 250° C., for a period of time in the range of about 0.001 up to about 6 hours. In some embodiments, the time at peak cure temperature is 0.01 up to about 0.5 hours.

In another embodiment of the invention, there are provided methods for adhesively attaching a microelectronic device to a substrate. Such methods can be performed, for example, by (a) applying an adhesive composition to the substrate and/or the microelectronic device, wherein the adhesive composition includes a polymerizable monomer vehicle, a modified calcium carbonate, and a curing catalyst, (b) bringing the substrate and the device into intimate contact to form an assembly wherein the substrate and the device are separated only by the composition applied in step (a), and thereafter, (c) subjecting the assembly to conditions suitable to cure the composition.

Curing conditions contemplated for carrying out the above-described method typically comprise a temperature in the range of about 60° C. up to 250° C., for a period in the range of about 0.001 up to about 6 hours. In some embodiments, the time at peak cure temperature is 0.01 up to about 0.5 hours.

In another embodiment of the invention, there are provided assemblies including a first article permanently adhered to a second article by a cured aliquot of the above-described composition. Such assemblies can be prepared from a variety of structures, e.g., wherein the first article is selected from a silicon-based microelectronic device, a gallium arsenide-based microelectronic device, a quartz-based microelectronic device, a sapphire-based microelectronic device, an indium phosphide-based microelectronic device, a cadmium sulfide-based microelectronic device, lithium niobate-based microelectronic device, and the like, and the second article is selected from lead frames, pin grid arrays, ceramics, and the like.

In a further embodiment of the invention, there are provided assemblies including a microelectronic device permanently adhered to a substrate by a cured aliquot of the above-described composition. Microelectronic devices contemplated for use in the practice of the present invention include lead frames, pin grid arrays, laminate materials, and the like.

As readily recognized by those of skill in the art, compositions according to the present invention can also be employed for the preparation of a variety of structures, e.g., advanced composites, molding resins, glob-top structures, underfill materials, and the like, employing techniques which are readily available in the art.

The invention will now be further described with reference to the following non-limiting examples.

EXAMPLES

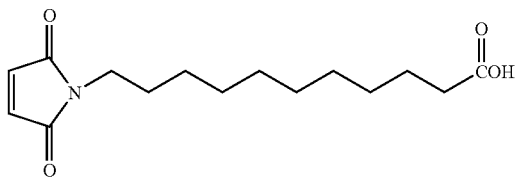

Example 1

The above bi-functional compound: 11-maleimidoundecanoic acid was prepared according to the following procedure: A two liter flask was charged with 61.25 grams (0.625 moles) maleic anhydride, 500 grams toluene, and 100 grams N-methylpyrrolidone (NMP). This mixture was stirred magnetically until all of the anhydride had dissolved and 100.5 grams (0.5 mole) of 11-aminoundecanoic acid was then added to this solution over the course of five minutes. The mixture was then stirred at 50-60° C. for one hour to fully form the maleamic acid. Twenty grams of methane sulfonic acid (MSA) was added to the mixture. The flask was equipped with a Dean Stark trap and condenser and then refluxed overnight. A total of 9.8 mLs water was collected (theoretical=9.0). The mixture was then cooled to room temperature and then placed in a two-liter separatory funnel and washed with twice with 200 mL deionized water to remove the NMP and MSA. The toluene phase was transferred to a two-liter round-bottom flask. The toluene was removed under vacuum at a temperature of 60° C. The residue was then sparged with air at a bath temperature of 70° C. to remove the last traces of toluene. The product was initially recovered as an amber liquid that froze to a waxy solid upon standing at room temperature. It weighed 129 grams (92% of theory).

Example 2

A 500 mL single neck flask was charged with 50.0 grams "Socal 31" (a precipitated, rhombohedral, high surface area, calcium carbonate powder from Solvay Advanced Functional Minerals), 2.5 grams 11-maleimidoundecanoic acid, 250 mL acetone, and a magnetic stir bar. A bubbler was attached and the mix was stirred at room temperature. Reaction between the acid and filler was evidenced by the evolution of carbon dioxide. The generation of carbon dioxide had ceased after twenty-four hours. The mixture was poured into a large stainless steel pan and the acetone was evaporated off. The solids were then further dried at 100° C. for four hours in an oven.

Example 3

A one-liter single-neck flask was charged with 100 grams Socal 31, 400 mL acetone, 3.0 grams 4-hydroxybenzoic acid, and a stir bar. A bubbler was attached to monitor the evolution of carbon dioxide. This mixture was stirred for thirty-six hours and then the modified calcium carbonate was recovered as described in example 2.

Example 4

The maleimide functionalized calcium carbonate from example 2 was intimately mixed in a one to one weight ratio with tricyclodecylmethyl acrylate (a mono-functional acrylate monomer). The composition was catalyzed with two parts per hundred of dicumyl peroxide. A portion of this composition was cured to make a pellet for testing by TMA. The cured sample was found to have a glass transition temperature of 41.3° C. The CTE below the $T_g$ was 44.5 ppm/° C. and the CTE above the $T_g$ was 90.9 ppm/° C. There was no evidence of thermoplastic behavior during the TMA run through 225° C. (i.e. there was no penetration by the TMA probe into the pellet). This result supports the conclusion that the modified calcium carbonate filler is acting as a cross-linker and when admixed and cured with a mono-functional acrylate monomer and resulted in a thermoset matrix devoid of any thermoplastic behavior.

Example 5

An adhesive composition was formulated using the treated calcium carbonate described in Example 2. A control composition was also made, using a calcium carbonate filler that was coated with a non-functional (stearic acid) coating. The compositional information for the test adhesive and its control are summarized in Table 1.

TABLE 1

| Component | Functional CaCO$_3$ Adhesive | Non-Functional CaCO$_3$ Adhesive |
|---|---|---|
| 1,3-Diisopropenyl benzene | 21.7% | 21.7% |
| Bismaleimidovinylnorbornene | 43.4% | 43.4% |
| Ricon 130MA20 | 3.5% | 3.5% |
| Silquest A186 | 0.7% | 0.7% |
| Genosil GF20 | 0.7% | 0.7% |
| Treated CaCO$_3$ from Example 2 | 30.0% | — |
| SPX CaCO$_3$ | — | 30.0% |

The two compositions from Table 1 were used to bond 300× 300×14 mil bare silicon die onto ceramic substrates. Six test parts were made from each composition. All parts were cured at 175° C. in an oven for one hour. Adhesion was measured via die shear at 260° C. using a Dage 4000 hot stage adhesion tester. The results of this testing as well as some of the cured properties of the two adhesive compositions in Table 1 are compared in Table 2.

TABLE 2

| Property | Functional CaCO$_3$ Adhesive | Non-Functional CaCO$_3$ Adhesive |
|---|---|---|
| Adhesion (kg force) | 101.24 ± 0.08 | 73.08 ± 6.58 |
| Failure Mode | Non-destruct | Material |
| Radius of Curvature (meters) | 0.2 | 0.21 |
| Modulus at 25° C. (via DMA) | 5.02 GPa | 5.12 GPa |
| Glass Transition Temperature | 191.9 | 172.0 |
| Coefficient of Thermal Expansion (below the T$_g$) | 41.9 | 62.0 |
| Coefficient of Thermal Expansion (above the T$_g$) | 47.1 | 88.9 |

The results presented in Table 2 show that while the modulus and radius of curvature were substantially the same for the two compositions, the T$_g$ was about twenty degrees higher when the functional filler was used. The coefficient of thermal expansion above, and below, the T$_g$ was also significantly lower for the test composition versus the control. The adhesion for the functional calcium carbonate adhesive exceeded the maximum of the shear test equipment and could not be further characterized. The control calcium carbonate adhesive did have the desirable type of cohesive (material) failure mode, but the adhesion was lower and with a wider distribution. These results support the value of calcium carbonate fillers modified with co-polymerizable surface treatments.

While the invention has been described in detail with reference to certain preferred embodiments thereof, it will be understood that modifications and variations are within the spirit and scope of that which is described and claimed.

What is claimed is:
1. An adhesive composition, comprising:
    (a) a polymerizable monomer vehicle selected from the group consisting of a maleimide, an acrylate, a methacrylate, a vinyl ether, a vinyl ester, an epoxy, a urethane, a polyester-linked acrylate, a polyester-linked methacrylate, a styrenic compound, an allyl functional compound, and a combination thereof; and
    (b) calcium carbonate having its surface modified with a surface modifier,
    wherein the surface modifier is selected from the group consisting of 4-maleimidobenzoic acid, 3-maleimidobenzoic acid, 4-hydroxybenzoic acid, furoic acid, cinnamic acid, sorbic acid, a fumaric acid ester, a maleic acid ester, an itaconic acid ester, vinylbenzene sulfonic acid and diallyl phosphate, with the further proviso that the urethane has the structure

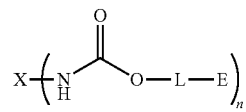

wherein:
    X is selected from the group consisting of a substituted or an unsubstituted aliphatic, aryl or heterocyclic;
    each E is independently a polymerizable moiety selected from the group consisting of an acrylate, a methacrylate, an olefin, an epoxy, a maleimide, vinyl ether, or vinyl ester;
    each L is independently selected from the group consisting of a bond, an alkylene linker and an oxyalkylene linker; and
    n is an integer having the value between 1 and about 10, with the further proviso that the polymerizable monomer vehicle is polymerizable via free radical polymerization.

2. The adhesive composition of claim 1, further comprising a coupling agent, an anti-oxidant, a stabilizer, a bleed control agent, an additional filler other than calcium carbonate, an inert diluent, a reactive diluent, an adhesion promoter, a flexibilizer, a dye, or a pigment.

3. The adhesive composition of claim 1, further comprising a curing catalyst.

4. The composition of claim 1, wherein the maleimide has the structure

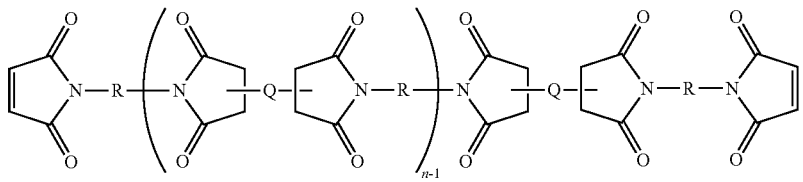

wherein
    each of R and Q is independently selected from the group consisting of substituted or unsubstituted aliphatic, aromatic, heteroaromatic, and siloxane moieties; and
    n is an integer having the value between 1 and about 10.

5. An adhesive composition, comprising:
(a) a polymerizable monomer vehicle, consisting of a polyester having the structure:

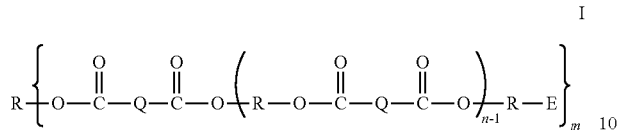

wherein:
each of R and Q is independently selected from the group consisting of a substituted or an unsubstituted aliphatic, an aryl, and a heteroaryl;
m is an integer having the value of 3 or 4;
n is an integer having the value between 1 and about 10; and
each E is independently selected from the group consisting of an acrylate, a methacrylate, a maleimide, styrenic, vinyl ester, an olefin, allyl, vinyl ether, an itaconate, a fumarate, an epoxy, oxetane, oxazoline, benzoxazine, a cyanate ester, and propargyl ether; and
(b) calcium carbonate having its surface modified with a functionalized carboxylic acid or ester,
wherein the substituted or unsubstituted aliphatic is selected from the group consisting of a straight or branched chain hydrocarbyl group and an alkenyl group.

6. The adhesive composition of claim 1, wherein the surface modified calcium carbonate comprises between about 2 wt % and about 75 wt % of the composition.

7. The adhesive composition of claim 1, wherein the adhesive composition has a higher $T_g$ after curing than a control adhesive composition containing calcium carbonate coated with a non-functional coating.

8. The adhesive composition of claim 1, wherein the adhesive composition has greater adhesiveness after curing than a control adhesive composition containing calcium carbonate with a non-functional coating.

9. The adhesive composition of claim 1, wherein the adhesive composition has a lower coefficient of thermal expansion after curing than a control adhesive composition containing calcium carbonate coated with a non-functional coating.

10. The adhesive composition of claim 5, wherein the functionalized carboxylic acid or ester bears a polymerizable moiety.

11. The adhesive composition of claim 5, wherein the functionalized carboxylic acid is maleimidoundecanoic acid.

12. The adhesive composition of claim 5, wherein the functionalized carboxylic acid is 4-hydroxybenzoic acid.

13. The adhesive composition of claim 5, wherein the surface modified calcium carbonate comprises between about 2 wt % and about 75 wt % of the composition.

14. An adhesive composition, comprising
(a) the polymerizable monomer vehicle of claim 1; and
(b) calcium carbonate modified with a surface modifier,
wherein the surface modifier is selected from the group consisting of maleimidoundecanoic acid, maleimidohexanoic acid, 4-maleimidobenzoic acid, 3-maleimidobenzoic acid, 2-maleimidoacetic acid, 3-maleimidopropionic acid, 4-maleimidobutanoic acid, 4-hydroxybenzoic acid, acrylic acid, methacrylic acid, furoic acid, cinnamic acid, sorbic acid, a fumaric acid ester, a maleic acid ester, an itaconic acid ester, vinybenzene sulfonic acid and diallyl phosphate, with the further proviso that the urethane has the structure

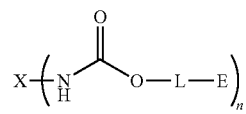

wherein:
X is selected from the group consisting of a substituted or an unsubstituted aliphatic, aryl or heterocyclic;
each E is independently a polymerizable moiety selected from the group consisting of an acrylate, a methacrylate, an olefin, an epoxy, a maleimide, vinyl ether, or vinyl ester;
each L is independently selected from the group consisting of a bond, an alkylene linker and an oxyalkylene linker; and
n is an integer having the value between 1 and about 10, with the further provisos that
(i) the polymerizable monomer vehicle is polymerizable via free radical polymerization; and
(ii) the surface modifier the mass ratio between calcium carbonate and the surface modifier is about 20:1.

* * * * *